Jan. 14, 1969  J. E. CROMWELL ET AL  3,421,972
PROCESS FOR DIRECTLY BONDING POLYTETRAFLUOROETHYLENE TO
METAL, ADHESIVE COMPOSITION USED THEREFOR AND
LAMINATED PRODUCT THEREOF
Filed June 28, 1965  Sheet 1 of 2
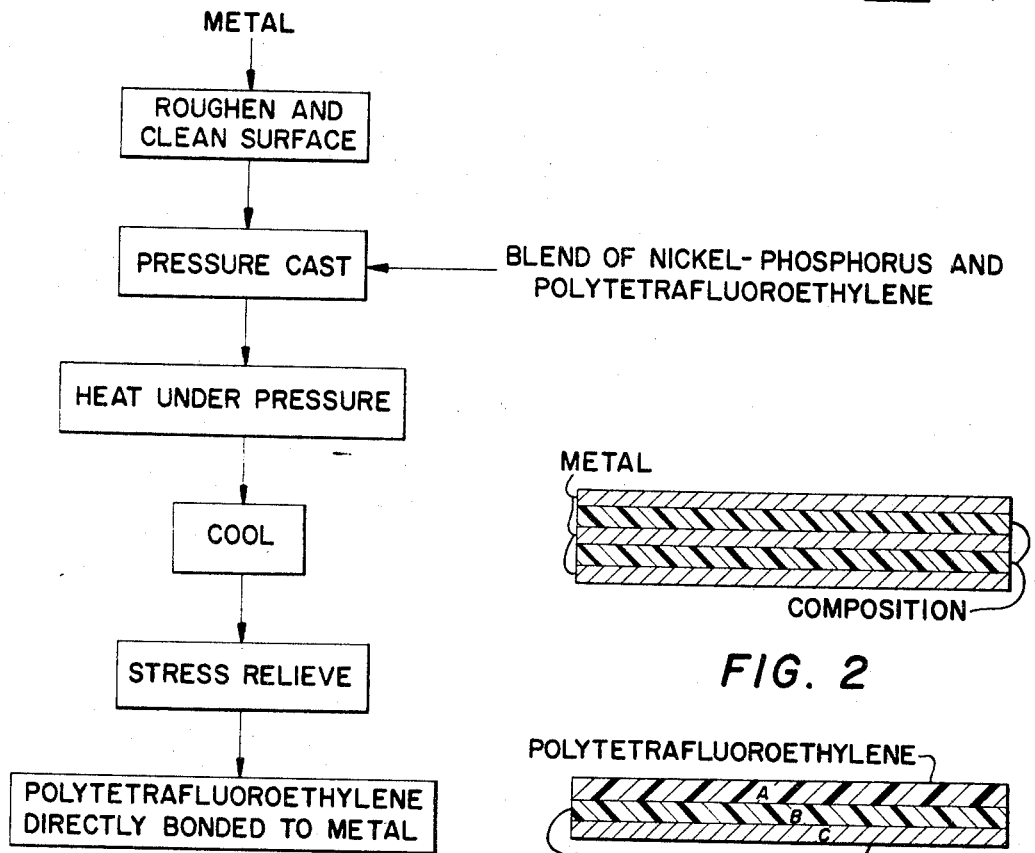
FIG. 1
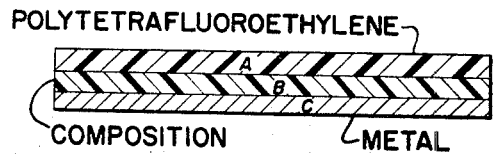
FIG. 2
FIG. 3
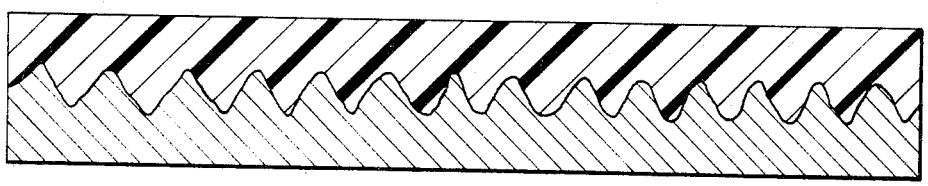
FIG. 5
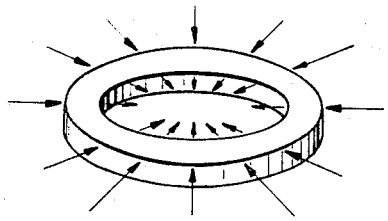
FIG. 4
INVENTORS.
JOHN E. CROMWELL &
ARTHUR G. ROBSON
BY Boyce C. West
their Attorney

United States Patent Office 3,421,972
Patented Jan. 14, 1969

3,421,972
PROCESS FOR DIRECTLY BONDING POLYTETRA-
FLUOROETHYLENE TO METAL, ADHESIVE
COMPOSITION USED THEREFOR AND LAMI-
NATED PRODUCT THEREOF
John E. Cromwell and Arthur G. Robson, Baltimore,
Md., assignors to Koppers Company, Inc., a corpora-
tion of Delaware
Filed June 28, 1965, Ser. No. 467,645
U.S. Cl. 161—189                                14 Claims
Int. Cl. B32b *15/08;* B32b *27/20;* B32b *31/12*

ABSTRACT OF THE DISCLOSURE

A polytetrafluoroethylene composition is directly bonded to a metal surface by roughening the metal surface, applying a layer of the composition to the surface, compressing the layer to the metal at superatmospheric pressure, and sintering the layer; the composition being a blend of polytetrafluoroethylene and nickel-coated phosphorus particles. The composition may be filled with materials such as glass fibers, coke flour, bronze powder and cadmium-oxide powder. The composition may be used as a coating for the metal or as an adhesive for adhering two layers of metal together.

This invention relates generally to coatings and more particularly to a polytetrafluoroethylene composition and a method for applying the composition as a coating to metal.

Polytetrafluoroethylene is commercially available under various trademarks, for example, it is sold under the tradename Teflon. It is useful as a surface coating on metals to provide excellent wear-resistance, extremely low coefficient of friction, high-chemical inertness, good electrical insulation, low thermal conductivity, and good resistance to heat damage to about 500° F. The characteristics, however, make difficult the application of polytetrafluoroethylene to metal surfaces as a coating that will adhere to the surface.

Heretofore, polytetrafluoroethylene has been applied in suspension form by pressure spraying, dipping, doctoring and brushing to the metal surface as a coating. Usually, several coatings are applied to give proper thickness; a common system comprising 3 primary and 8 top-coats to give a recommended total thickness of 20 mils. These coatings are then fused at temperatures from 680° to 750° F. A method used particularly with polytetrafluoroethylene which is filled, for example, with colloidal carbon is to bond the polytetrafluoroethylene sheet to the metal with a suitable adhesive. As an illustration, a sheet of polytrifluorochloroethylene may be sandwiched between a sheet of polytetrafluoroethylene and the metal. Since the polytrifluorochloroethylene will melt before the polytetrafluoroethylene gels, the assembly can be placed under pressure and heated to cause the polytrifluorochloroethylene to melt and subsequently upon cooling to adhere to the metal and to the polytetrafluoroethylene thereby bonding the two materials. The melting point of the polytrifluorochloroethylene has severely limited the use of such bonded structures however. Because of the chemical inertness of the polytetrafluoroethylene the above method and other have been used with limited success.

We have now discovered a novel polytetrafluoroethylene composition which bonds readily to metallic surfaces. This novel composition comprising polytetrafluoroethylene and particles of phosphorus coated with nickel can be applied to the surfaces without the necessity of using another adhesive or the cumbersome steps of spraying as was done heretofore.

Tetrafluoroethylene resin or polytetrafluoroethylene is a completely fluorinated plastic material obtained by polymerizing tetrafluoroethylene gas. Tetrafluoroethylene resins are available commercially in a number of different forms to meet the various needs of fabricators. The powdered form of tetrafluoroethylene resin is the desirable form for use in this invention. A material sold, for example, under the trademark Teflon 7 has been found to be particularly desirable for use in this invention.

Nickel-phosphorus is also available in particle form. These particles are in the form of a nucleus of phosphorus coated with a layer of nickel. The composite particles are made by hydrogen reduction of nickel sulphide in a nickel-bearing solution. The nickel is caused to precipitate on minute particles of suspended phosphorus. The nickel precipitates on the particle in such a manner that the phosphorus particles are encased in a sheet of nickel. The reaction from the formation of these particles takes place in an autoclave under a pressure of 250 p.s.i. at a temperature of 350° F. Any desired thickness of the nickel coating may be obtained through special processing. Particularly desirable for use in this invention are particles that consist essentially of 18-21% phosphorus and 78-82% nickel by weight. Impurities such as cobalt, copper, iron, sulfur, and carbon may be present in individual amounts up to one percent by weight, although higher impurity content is not known to be detrimental. Preferably, the particles will be finely divided so as to pass through a −200 mesh screen. A suitable nickel-phosphorus powder is described in a brochure, "Metallurgical Products, Issue No. 5" dated January 1963, by Sherritt Gordon Mines, Ltd., in Toronto, Ontario, Canada.

The novel composition is made by blending the polytetrafluoroethylene and nickel-phosphorus powders. The blending can conveniently be carried out in a conventional twin-shell blender. The composition should contain at least 4% of nickel-phosphorus by weight with the balance being polytetrafluoroethylene. If less than 4% nickel-phosphorus is used, the desirable bond characteristic decreases. On the other hand, if more than 10% is used, the tensile strength of the polytetrafluoroethylene is decreased so that it is not useful in many applications. The use of 4–6% nickel-phosphorus provides good adhesion without decreasing the tensile strength of the polytetrafluoroethylene to any substantial degree.

To the composition may be added conventional wear-resistant fillers such as glass fibers, coke flour, bronze powder, aluminum fibers, asbestos, carborundum fibers, carbon black, cadmium oxide powder. The wear-resistant materials may be used singly or in combination to provide desirable characteristics to the composition as required by a particular application. While the wear-resistant additives may be used in various amounts, particular proportions have been found to be the most desirable. Following is a chart showing the preferred upper and lower limits of the additives which will result in a useful composition for bearings, seals, and the like.

EXAMPLES

| Composition, percentage by wt. | 1 | 2 | 3 | 4 | 5 |
|---|---|---|---|---|---|
| Nickel-phosphorus | 4–6 | 4–6 | 4–6 | 4–6 | 4–6 |
| Glass fibers | | 24–26 | | | |
| Coke flour | | 1.5–2.0 | 23–25 | | |
| Bronze powder | | | | 63–64 | |
| Cadmium oxide powder | | | | | 49–51 |
| TFE | Balance | Balance | Balance | Balance | Balance |

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 1 is a block diagram showing a process for applying the novel composition to a metal surface;

FIGURE 2 is a sectional view of a laminated article whose metallic laminations are joined together by the novel composition;

FIGURE 3 is a sectional view of an article having metallic surface and polytetrafluoroethylene surface bonded together by the novel composition of the invention;

FIGURE 4 is a diagram showing the direction of contraction of a ring of polytetrafluoroethylene after subjection to stress relieving;

FIGURE 5 is a diagram illustrating the theory of increased adhesive strength due to stress relieving;

Figure 6:
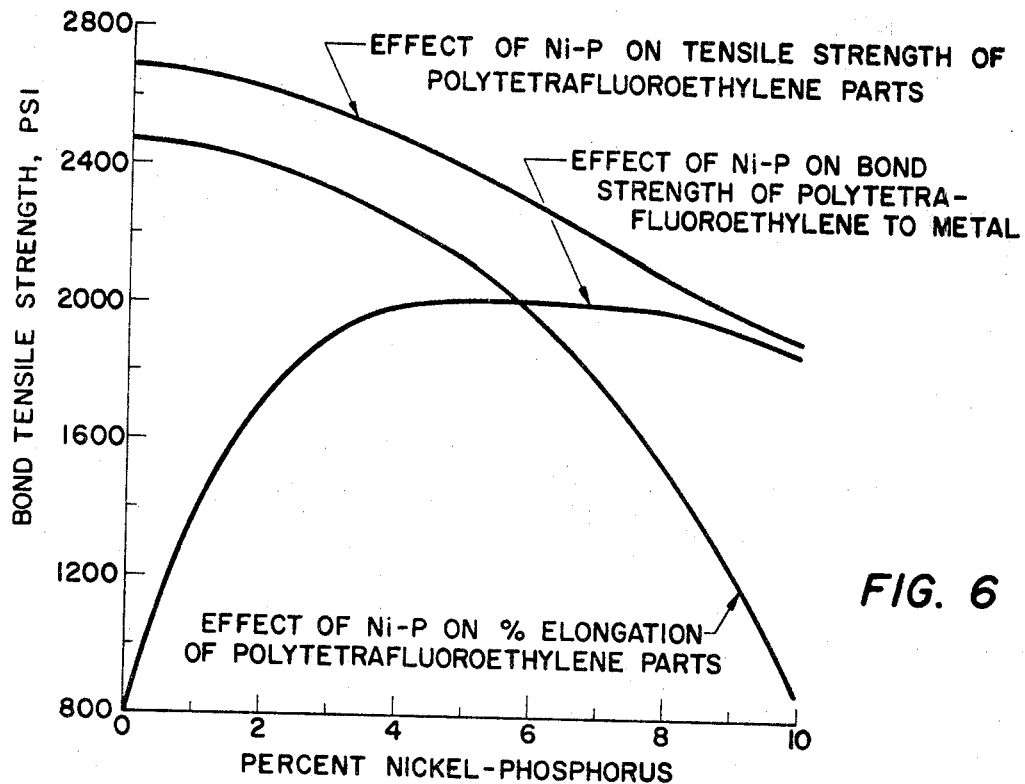
FIGURE 6 is a graph showing the effect of the addition of nickel-phosphorus on the mechanical properties and bond strength of polytetrafluoroethylene.

Referring to FIG. 1, the method of applying the polytetrafluoroethylene to a metal surface is illustrated by a flow diagram. The surface of the metal to be coated is roughened and cleaned in a conventional manner. Roughening of the surface can be done, for example, by sand or grit blasting or by mechanically cutting grooves, slots and the like on the surface of the metal so as to provide a relatively rough, discontinuous surface. The surface is also preferably cleaned by suitable solvents such as, for example, acetone, carbon tetrachloride or toluene to remove any traces of grit or oil.

The composition is conveniently applied to the metal by confining it in a suitable mold with the metal object. Thereafter the particles are compacted and compressed against the roughened surface at superatmospheric pressure in excess of 2,000 pounds per square inch, although the pressure found to be the most effective is about 10,000 pounds per square inch. At pressures less than 2,000 p.s.i., the composition will not hold together; excessive pressure is not helpful. The pressure should be maintained for a sufficient time to permit entrained air to escape; one second usually being sufficient. When the pressure is removed, the composition will be adhered to the metal surface.

The assembly of metal and compressed composition may then be placed in a conventional fixture which will insure pressure in excess of 20 pounds per square inch on the composition which may then be sintered at a temperature of 500° to 1,000° F. Below 500° F., the composition may be incompletely fused and above 1,000° F., there is a tendency for the composition to char. The preferable temperature is about 720° F. This temperature should be maintained for a period of approximately 30 minutes per quarter inch of thickness of the composition. The time, of course, is a function of temperature and it is readily determined by the artisan when the fusion is complete. Upon completion of the sintering cycle, the composition and metal are allowed to cool. It will then be found that the composition is mechanically bonded to the metal surface.

The optimum range of lock-up pressures during sintering is from 20-100 pounds per square inch. Below 20 pounds per square inch, it appears that the composition is not forced into the roughened surface of the metal sufficiently to permit successful adhesion thereto. At pressures exceeding 100 pounds per square inch, there is a tendency for the polytetrafluoroethylene to extrude and, consequently, adhesion is adversely affected.

Reliable bond strengths have been achieved which are as high as the tensile strengths of filled polytetrafluoroethylene. Cyclic heating tests comprising 50 cycles of heating to 300° F. in hot oil followed by plunging into Dry Ice and acetone at −85° have not affected the bond strengths obtained. An addition of nickel-phosphorus in amounts of 4%-8% to the polytetrafluoroethylene does not lower either its tensile or elongation properties to an appreciable extent. In amounts exceeding 10%, the tensile and elongation properties begin to be adversely affected.

The results of duplicate tensile tests indicate that from 0-4% addition of nickel-phosphorus to polytetrafluoroethylene, the tensile properties of the bond between the composition and the metal increase from 840 pounds per square inch, for polytetrafluoroethylene without nickel-phosphorus, to 2,000 pounds per square inch at 4% addition of nickel-phosphorus. The 2,000 pounds per square inch value remains constant with the addition of nickel-phosphorus up to 8%; the tensile value begins to decrease at additions of more than 8% until it reaches 1,860 pounds per square inch with 10% nickel-phosphorus added. Consequently, an addition of 4–6% nickel-phosphorus is considered optimum. The graph of FIG. 6 illustrates the effect on tensile and elongation properties of the bond by the addition of nickel-phosphorus to polytetrafluoroethylene.

The composition to metal bonds, described above, can be achieved without compacting the composition directly to the metal surface. This may be done by compacting the composition itself in the form of a block or tape or the like. The compacted composition may be locked up in the mold with the metal to which it is to be joined and then sintered. The resultant bond will be as good as if the composition had been compacted against the metal before sintering.

The particular mechanism of the bonding between the metal and the tetrafluoroethylene is not completely known. However, referring to FIGS. 4 and 5, it is belived that the bond between the composition and the roughened material is analogous to surrounding the peaks of the metal with a material that shrinks when it is allowed to cool after sintering so that the composition is actually locked to the metal. When oxides are permitted to form on the metal, the peaks break off and consequently, there are no forces locking the composition to the metal. The addition of nickel-phosphorus to polytetrafluoroethylene is necessary in order to attain high strength bonds. When nickel-phosphorus is not added, a heavy oxide layer between the polytetrafluoroethylene and metal is observed and the resultant bond is poor. When nickel-phosphorous is added, no such oxide layer is observed, especially of the kind usually formed above 400° F., and the nickel-phosphurs inhibits the formation of oxides at the temperature range of 400–450° F., the nickel-phosphorus partially decomposes, exuding a protective vapor which inhibits the formation of oxides on the metal interface. It is further believed that the nickel-phosphorus progressively decomposes up to 700° F. At this temperature, nickel-phosphorus reacts exothermically thereby providing both localized heat and a protective vapor. When the bond is broken between polytetrafluoroethylene and the metal, when nickel-phosphorus is not used, particles of oxidized metal are found in the polytetrafluoroethylene surface. Thus, it seems that the little peaks of metal have become brittle from oxidation and are broken off easily so that the bond is poor. Without oxidation, the little mountains remain strong and the composition is locked firmly to them. Sintering of polytetrafluoroethylene, without nickel-phosphorus, to metal has been tried in a non-oxidizing atmosphere. The result was poor because the atmosphere is apparently able to reach only the edges of the metal interface, thus oxides still formed on the central surfaces and the resultant bond was poor. The addition of nickel-phosphorus prevents the formation of oxides over the whole interface and thus results in a good composition to metal bond.

Figure 7:
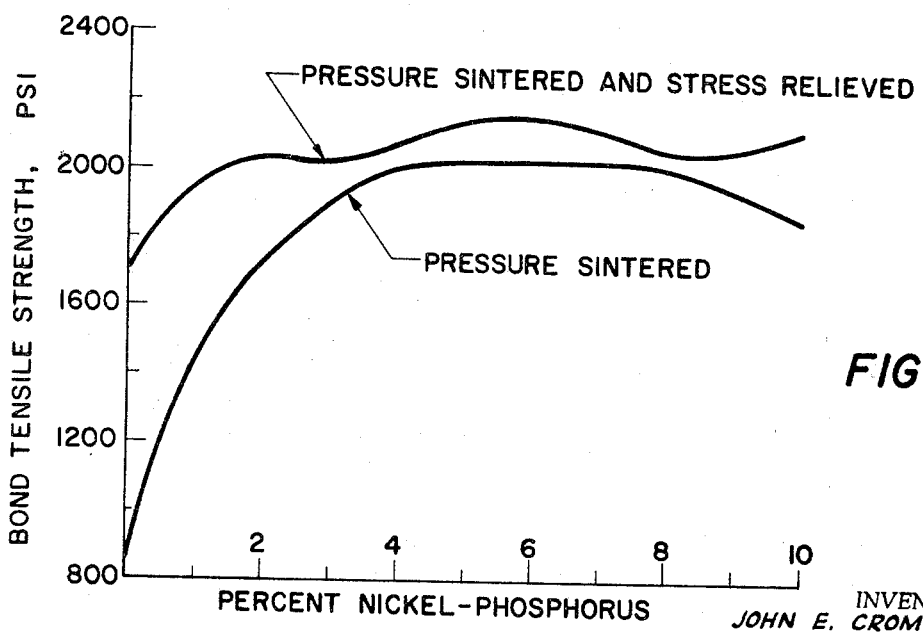
FIGURE 7 is a graph showing the effect of stress relieving the bonded structure.

It has, in addition, been found that stress relieving of the polytetrafluoroethylene greatly increases the bond strength. FIG. 7 illustrates the effect of stress relieving the sintered structure. The lower line shows the effect on the strength of the bond by the addition of increasing percentages of nickel-phosphorus to the polytetrafluoroethylene. The upper line shows the effect of stress-relieving the equivalent structure. Such stress relieving may be accomplished by immersing the structure in oil heated to 230° F. for approximately an hour. The immersion time depends somewhat on the size of the structure being stress-relieved. It can be seen that the tensile bond strength values for stress-relieved sintered structures are higher than the ones for the non-stress relieved structures. It is believed that stress relieving permits the composition to contract and lock around the little mountains on the metal interface. It has been well documented that polytetrafluoroethylene rings, made by sintering, undergo a size change due to stress relieving in the range of 200-500° F. During sintering, the composition remains in contact with the ragged surface of the metal interface because of the lock-up pressure. After sintering, the composition remains in intimate contact with the ragged surface but in a condition of stress. When stress relieved, the composition shrinks towards its natural center on a microscopic scale analogous to geometrical changes which occur in a larger ring. In this case, the composition shrinks towards its natural center which is a microscopic mountain. Since there are thousands of microscopic mountains, the composition is firmly locked to the interface. When a bond has been broken by excessive stress, the minute peaks have been found embedded in the composition.

The novel composition of this invention lends itself well to the formation of laminates wherein two metal surfaces are bonded together by a film of the polytetrafluoroethylene. The surface to be bonded of each metal is roughened and cleaned in a manner as previously described. Thereafter the metals are placed in a mold with the roughened surfaces facing each other and with a layer of the novel composition placed between the surfaces. Thereafter, the structure is subjected to superatmospheric pressure, preferably at 10,000 pounds per square inch to compact the assembly. When the structure is then removed from the mold, it will be observed that the metal objects are now joined together by means of the composition although this bonding is not strong. The assembly may be left in the mold, and the same mold that is used for compacting the composition between the metal objects may be placed in the sintering machine, or, if desired, the structure may be removed from this mold and placed in another mold to be placed in the sintering machine. In either event, the mold must be such that a pressure of about 20 pounds per square inch is exerted against the structure during sintering. The structure is then sintered, as stated hereinabove, at a temperature, preferably of 720° F., for a period of approximately 30 minutes per quarter inch of thickness of the composition.

Upon completion of the sintering cycle, the structure is removed from the mold and allowed to cool. Advantageously, the structure is stress relieved in hot oil as described above.

The resultant laminated structures have been found to be bonded together so that a force greater than the tensile strength of the polytetrafluoroethylene composition is required to break the bond between the composition and the metal.

The foregoing laminated structures are particularly desirable for use in chemical atmospheres where conventional bonding agents for metal have not been resistant to the atmosphere. Such laminates are also useful in applications where it is desirable to electrically insulate one of the metal objects from the other. For example, a coupling hub has been electrically insulated from a shaft upon which it is mounted. Such laminates are also useful in applications where low heat conductivity is desired between two metal parts. These laminates are particularly useful also where lubrication by conventional means is difficult and high temperature environments up to 500° F. are involved.

In another embodiment of the invention, the laminated structure comprises a layer of polytetrafluoroethylene bonded to a metal object by means of the novel composition. The surface of the metal is roughened and cleaned. Thereafter, a coating of the composition is compacted against the metal as previously set forth. A coating of particulated polytetrafluoroethylene is then compacted against the novel composition. The compacted structure is then sintered under pressure, as previously set forth, cooled and stress relieved. Alternatively, both coatings may be placed next to the metal and compacted simultaneously.

It may also at times be desirable to precompact the composition and/or the polytetrafluoroethylene in the form of blanks, sheet, tape, or film and apply the compacted material to the metal surface. The precompacted material is pressed to the metal and sintered and stress relieved as previously explained. An excellent bond results.

The novel composition of this invention also provides a good bonding agent for bonding a precast layer of polytetrafluoroethylene to metal. As illustrated in FIG. 3, a layer A of cast polytetrafluoroethylene is bonded to the metal substrate C by way of the novel composition of this invention B. A layer B of the novel composition of this invention is sprinkled on the cleaned and roughened metal surface C, and the layer A of cast polytetrafluoroethylene is placed on the sprinkled layer. The entire assembly was compressed under a pressure of 10,000 pounds per square inch and then the assembly was removed and sintered at 720° F. in the usual fashion. The result was a complete bonding of the layer to form an integral unitary structure. The adhesive layer was not distinguishable from the original polytetrafluoroethylene layer.

What is claimed:

1. A process for directly bonding polytetrafluoroethylene to metal which comprises roughening the surface of the metal, applying to said roughened surface a layer of a composition comprising a blend of polytetrafluoroethylene and nickel-coated phosphorus particles, subjecting said metal and composition to superatmospheric pressure to compact the composition, and sintering said composition.

2. The process which comprises roughening the surface of metal, cleaning said surface with a solvent, applying to said surface a layer of the powdered polytetrafluoroethylene and nickel-coated phosphorus particle composition, subjecting said metal and said composition to superatmospheric pressure in excess of 2,000 pounds per square inch to compact the composition, and sintering said composition under pressure at a temperature of 500 to 1,000° F. for a period of thirty minutes per quarter inch of thickness of the composition.

3. The process of claim 1 with the additional step of stress relieving the sintered article by maintaining it at a temperature between 200° and 500° F. for at least one hour.

4. The process of claim 1 wherein the composition includes a filler to increase the wear-resistance of the polytetrafluoroethylene, which filler is a material selected from the group consisting of glass fibers, coke flour, bronze powder, and cadmium oxide powder.

5. A process for directly bonding polytetrafluoroethylene to metal which comprises the steps of blending together tetrafluoroethylene, nickel-coated phosphorus particles and a wear-resistant material selected from the group consisting of glass fibers, coke flour, bronze powder, and cadmium oxide powder, roughening the surface of the metal, cleaning said surface with a solvent, applying a layer of said composition to said surface, subjecting said metal and said composition to superatmospheric pressure in excess of 2,000 pounds per square inch to compact said composition to said surface, and sintering said composition under pressure at a temperature of 500 to 1,000° F. for a period of thirty minutes per quarter inch of thickness of the composition.

6. The process of claim 5 including the additional step of stress relieving the sintered composition by immersing it in oil at a temperature of between 200 and 500° F. for at least one hour.

7. A process for bonding polytetrafluoroethylene to metal which comprises roughening the surface of the metal, applying to said surface a layer of a powdered composition consisting of polytetrafluoroethylene and nickel-coated phosphorus particles, applying to said composition layer a further layer of unfilled polytetrafluoroethylene, subjecting said metal and said layers to superatmospheric pressure to compact the layers, and sintering said layers.

8. A process for bonding polytetrafluoroethylene to metal which comprises roughening the surface of the metal, applying to said surface a first layer of a powdered composition consisting of polytetrafluoroethylene and nickel-coated phosphorus particles, applying a second layer of unfilled polytetrafluoroethylene to said first layer, subjecting said metal and layers to superatmospheric pressure in excess of 2,000 pounds per square inch to compact the layers, sintering said layers under pressure at a temperature of 500 to 1,000° F. for a period of thirty minutes per quarter inch of thickness of said layers, and stress relieving the sintered layers at a temperature of between 200 and 500° F. for at least one hour.

9. A process for bonding polytetrafluoroethylene to metal which comprises roughening the surface of the metal, applying to said roughened surface a first layer of a powdered composition consisting of polytetrafluoroethylene and nickel-coated phosphorus particles, subjecting said metal and said first layer to superatmospheric pressure to compact said first layer, thereafter applying a second layer of polytetrafluoroethylene to said first layer, subjecting said metal and said layers to superatmospheric pressure to compact said second layer, sintering said layers, and stress relieving the layers.

10. A laminated product comprising a metallic element having a surface bonded to a polytetrafluoroethylene surface by an adhesive comprised of a blend of polytetrafluoroethylene and nickel-coated phosphorus particles.

11. The laminated product comprising a plurality of metallic surfaces bonded together by a polytetrafluoroethylene adhesive wherein the adhesive consists of by weight 1 part of nickel-coated phosphorus particles and 9 to 24 parts of polytetrafluoroethylene.

12. A coated product comprising, a metallic element, a coating consisting of polytetrafluoroethylene, nickel-coated phosphorus particles, and a wear-resistant material, said coating being bonded to at least one surface of said metallic element, the ratio by weight of polytetrafluoroethylene to nickel-coated phosphorus particles being within the range of 9 to 1 to 24 to 1.

13. A polytetrafluoroethylene composition that is usable for direct bonding to a metal surface by roughening the metal surface, applying a layer of the composition to the surface, subjecting the metal and layer to superatmospheric pressure to compact the layer, and sintering the layer which comprises a blend of polytetrafluoroethylene and nickel-coated phosphorus particles, said particles constituting between 4 and 10% of the total weight of the blend.

14. The composition of claim 13 including a wear-resistant material as a filler.

References Cited

UNITED STATES PATENTS

| Re. 24,856 | 8/1960 | Panagrossi et al. | 161—189 X |
|---|---|---|---|
| 2,690,401 | 9/1954 | Gutzeit et al. | 29—195 X |
| 2,728,698 | 12/1955 | Rudner | 161—189 X |
| 2,809,130 | 10/1957 | Rappaport | 161—189 X |
| 3,094,585 | 6/1963 | Rudner | 174—77 |
| 3,198,691 | 8/1965 | Thomas et al. | 161—189 X |
| 3,314,916 | 4/1967 | Cupery | 260—41 |
| 3,338,688 | 8/1967 | Longo | 29—192 |
| 3,304,221 | 2/1967 | Eggleton | 156—333 X |
| 3,342,667 | 9/1967 | Berlinghof | 161—174 X |
| 3,376,183 | 4/1968 | Flynn et al. | 161—189 X |

HAROLD ANSHER, *Primary Examiner.*

U.S. Cl. X.R.

161—218, 174; 156—279, 333; 29—182.3, 182.5, 192, 195; 260—41, 900; 117—22, 75; 75—208